United States Patent Office 2,897,203
Patented July 28, 1959

2,897,203

PURIFIED PYRIDOXINE, ANALOGS AND PROCESS

Gino Carrara and Emilio Testa, Milan, Italy, assignors to Lepetit S.p.A., Milan, Italy No Drawing. Application February 8, 1956
Serial No. 564,324

Claims priority, application Great Britain
February 10, 1955

11 Claims. (Cl. 260—295)

The present invention relates to the preparation of pure vitamins and analogs thereof.

More particularly, the invention concerns the preparation of pure pyridoxine hydrochloride and homologous compounds, the base corresponding to the following generic formula

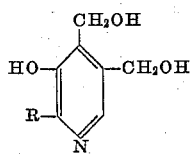

wherein R is a member of the class consisting of phenyl and lower aliphatic alkyl radicals, by starting from compounds of the following generic formula

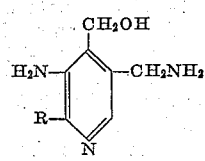

in the form of their dihydrochlorides.

The preparation of one of the starting compounds of the present invention, in which R is methyl, is described by S. A. Harris and K. Folkers in J. Am. Chem. Soc. 61, 3307 (1939). This compound, 2-methyl-3-amino-4-hydroxymethyl-5-aminomethylpyridine, is converted into pyridoxine hydrochloride, i.e. the compound of the above first generic formula in which R is methyl, by reacting it with sodium nitrite in hydrochloric acid at 90–95° C., evaporating to dryness the resulting solution and separating pyridoxine hydrochloride from sodium chloride by extraction with hot anhydrous ethyl alcohol, in which sodium chloride is sparingly but nevertheless appreciably soluble.

From the ethyl alcohol solution pyridoxine hydrochloride is then precipitated by dilution with acetone. A yield of 45% is reported.

This process has two disadvantages. Firstly, the yield is very low; moreover, by admixing with alcohol the mixture of pyridoxine hydrochloride and sodium chloride, the inorganic salt is not totally eliminated, but it is found in the final product in a ratio up to 5%. In fact, since pyridoxine hydrochloride is only very slightly soluble in ethyl alcohol, a large amount of this solvent must be employed; and, it is known that one liter of ethyl alcohol dissolves about 0.5 g. of sodium chloride. The obtained impure pyridoxine hydrochloride requires several crystallisations which contribute to lower the yield and fail to eliminate totally the mineral impurities from the final product.

We have now found that pyridoxine hydrochloride as well as its homologs can be obtained totally pure and with very high yields by a process which can be summarized as follows. One mole of 2-alkyl (or phenyl)-3-amino-4-hydroxy-methyl-5-aminoethylpyridine dihydrochloride dissolved in aqueous 2-3% sulfuric acid containing about two moles of an alkali metal bromide, is warmed to 80° and reacted with 2-3 moles of an alkali metal nitrite. After destroying the excess nitrite, for example by addition of sulfamic acid, the sulfuric acid content is raised to a concentration of about 5%, and the mixture is warmed for an additional 7 to 8 hours at 80° C. After cooling, the mixture is made neutral by addition of an alkali and treated with acetic anhydride for about 30 minutes at a temperature of 0° to 50° C. The resulting solution is extracted with ethyl acetate, the solvent is removed by distillation and the residue is hydrolyzed by heating it for about 30 minutes at 90° to 100° C. with about 10% hydrochloric acid. The mixture is again evaporated to dryness and the residue is recrystallized from an appropriate solvent.

The obtained product is analytically pure; on ignition, no residue is found. The yield ranges between 75 and 85% of the theoretical amount.

Some features of the above described procedure are strictly indispensable to obtain the desired yields and purity. For example, the use of sulfuric instead of hydrochloric acid employed by Harris and Folkers is of importance in raising the yield of diazotization with the alkali metal nitrite and is essential to the hydrolysis which follows the diazotization.

The presence of bromine ions in the medium in which the diazotization is carried out is also very useful for increasing the yield: the same results are not obtained with other halogen ions. The bromine ions have presumably a double action: they improve the diazotization and cause the formation of an intermediate compound which on hydrolysis, yields the final compounds of the present invention. In the case pyridoxine hydrochloride is prepared, we have determined the pyridoxine content in the reaction medium by the colorimetric assay described by Hochberg et al. in J. Biol. Chemistry 155, 109 (1944) and noted that soon after the diazotization with alkali nitrite has been effected, the solution contains an amount of pyridoxine corresponding to a maximum yield of 60%. In the course of the following hydrolysis with sulfuric acid the content of pyridoxine in the solutions rises gradually up to a yield of over 90% after 7 to 8 hrs. It results from the fact that in the course of diazotization in sulfuric acid a brominated intermediate compound is formed, which is gradually hydrolyzed by sulfuric acid.

The temperature of 80° C. in the diazotization and in the subsequent hydrolysis is also essential. We have noted that at 70° as well as at 90° the yields decrease substantially.

Once the sulfuric acid hydrolysis is accomplished, as stated above, the solution is made neutral by addition of an alkali. It is apparent that the resulting solution contains, besides the final compound, an amount of mineral salts which it is difficult to remove to obtain a pure product. We have however isolated the products in a very pure form by a process which can be used in every case pyridoxine or its homologs must be purified. Acetic anhydride is added to the solution at low temperature, whereby a diacetyl derivative is formed, which can be extracted from the solution with ethyl acetate. The mineral salts are totally insoluble in this solvent. The crude diacetyl derivative can be isolated by removing the solvent and purified, but preferably it is directly hydrolyzed with hydrochloric acid to yield the final compound. We have found that the diacetyl derivative corresponds to the following generic formula

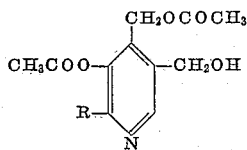

and has not been described in the chemical literature.

The most important diacetyl derivative, which on hydrolysis yields pyridoxine, i.e. 2-methyl-3-acetoxy-4-acetoxymethyl-5-hydromethylpyridine:

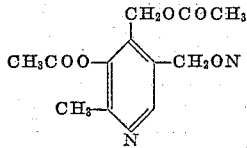

has a melting point of 90–92 C. and gives a hydrochloride melting at 159–161° C. Its structure has been ascertained by oxidation with chromium trioxide in acetic acid to obtain 2-methyl-3-acetoxy-4-acetoxymethylnicotinic acid:

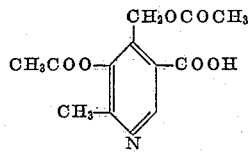

and subsequent hydrolysis with hydrochloric acid to yield the lactone:

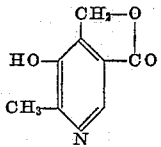

which after crystallization from alcohol has the M.P. 272–273°. This lactone has been prepared by us through another route which has already been reported (J. Am. Chem. Soc. 61, 1242 [1939]) and has been found to be identical with the product obtained as described above. It is thus different from the lactone

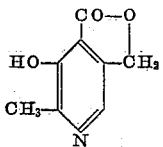

obtained by oxidizing pyridoxal according to Folkers, J. Am. Chem. Soc. 66, 2088 (1944).

Moreover, since the diacetyl derivatives prepared according to our procedure do not give the reaction of phenolic hydroxyl with iron trichloride, there is no doubt that they correspond to the above indicated formula.

It is quite apparent that the diacetyl derivatives are of utmost importance for obtaining final compounds free from inorganic impurities, since they can be extracted from the reaction medium by a solvent in which the mineral salts are quite insoluble.

The following examples clearly illustrate our present invention, although they are not intended to indicate its limits.

*Example No. 1*

A mixture of 180 g. 2-methyl-3-amino-4-hydroxymethyl-5-aminomethylpyridine dihydrochloride, 160 g. sodium bromide, 4000 ml. water and 92 g. concentrated sulfuric acid is quickly heated to 80° C. At this temperature a solution of 120 g. sodium nitrite in 500 ml. water is added in about half an hour. The mixture is heated to 80° for an additional 15 minutes, then enough sulfamic acid is added to destroy the excess nitrous acid, followed by addition of a solution of 180 g. concentrated sulfuric acid in 800 ml. water. The mixture is kept for 8 hrs. at 80°, then it is cooled to between 0° and +5° C., neutralized to pH 7.2 to 7.5 with sodium hydroxide and admixed with 800 ml. acetic anhydride. The mixture is stirred for half an hour at 0° to 5° C., then it is extracted with five 5-liter portions of ethyl acetate. The combined extracts are washed with 1500 ml. water, dried several hours over anhydrous sodium sulfate and evaporated to dryness after decolorization with charcoal. The residue is heated for 30 minutes at 95–100° C. with 1600 ml. 10% hydrochloric acid and the resulting solution is evaporated to dryness in vacuo. The residue is dissolved in 12 liters anhydrous ethyl alcohol, the solution is concentrated until crystals separate and then cooled overnight in a refrigerator. The crystals are collected by suction, washed with a small amount of cold anhydrous ethyl alcohol and dried. Yield 130 g. (85%) of pyridoxine hydrochloride assaying 100%, M.P. 207–208° C., Cl, percent found 17.32, calc. 17.24. The product on ignition does not give an appreciable residue. The product meets all other requirements prescribed by the New Non-Official Remedies.

*Example No. 2*

A mixture of 26.8 g. 2-isopropyl-3-amino-4-hydroxymethyl-5-aminomethylpyridine dihydrochloride, 27.5 g. potassium bromide, 600 ml. water and 14 g. concentrated sulfuric acid is heated quickly to 70° C., and a solution of 22 g. potassium nitrite in 80 ml. water is added in about half an hour. The mixture is heated to 80° C. for an additional 15 minutes, then enough sulfamic acid is added to destroy the excess nitrous acid, followed by addition of a solution of 24 g. concentrated sulfuric acid in 120 ml. water. The mixture is heated for 8 hrs. at 80° C., then it is cooled to between 0° and +5° C., neutralized to pH 7.2–7.5 with potassium hydroxide and admixed with 120 ml. acetic anhydride. The solution is stirred for half an hour at 0° to +5° C., and then extracted with three 1-liter portions of ethyl acetate. The combined extracts are washed with 300 ml. water, dried several hours over anhydrous sodium sulfate and evaporated to dryness. The residue is heated for 30 minutes at 95–100° C. with 250 ml. 10% hydrochloric acid and the resulting solution is evaporated to dryness in vacuo. The residue is recrystallized from methyl alcohol. Yield 18 g. (78%) of 2-isopropyl-3-hydroxy-4,5-dihydroxymethylpyridine hydrochloride assaying 100%, M.P. 192–193° C.

*Example No. 3*

A mixture of 29.6 g. 2-amyl-3-amino-4-hydroxymethyl-5-aminomethylpyridine dihydrochloride, 24 g. sodium bromide, 600 ml. water and 12 g. concentrated sulfuric acid is quickly heated to 80°, and a solution of 18 g. sodium nitrite in 100 ml. water is added in about 15 minutes. After an additional 15 minutes at 80°, the excess nitrous acid is destroyed with sulfamic acid and after addition of 140 ml. 25% sulfuric acid the mixture is heated for 7 hrs. at 80°, cooled to 0°, made neutral with sodium hydroxide and stirred for 1 hour with 120 ml. acetic anhydride between 0° and 5°. The mixture is extracted with a total of 5 liters ethyl acetate, the extract is washed with water, dried over sodium sulfate and evaporated to dryness. The residue is refluxed with 250 ml. 10% hydrochloric acid for 1 hour, evaporated to dryness in vacuo and the residue is recrystallized from amyl alcohol. Yield 21 g. (81%) of 2-amyl-3-hydroxyl-4,5-dihydroxymethylpyridine hydrochride assaying 100%, M.P. 185–187° C.

*Example No. 4*

To a mixture of 25.4 g. 2-ethyl-3-amino-4-hydroxymethyl-5-aminomethylpyridine dihydrochloride, 27.5 g. potassium bromide and 700 ml. aqueous 3% sulfuric acid previously heated to 80° a solution of 22 g. potassium nitrite is added in about half an hour. After having destroyed the excess nitrous acid with sulfamic acid, the mixture is diluted with 150 ml. of about 25% sulfuric acid and heated for 8 hrs. at 70°. After cooling to 0° and neutralization with potassium hydroxide the mixture is stirred with 100 ml. acetic anhydride for 30 minutes without rising above 5° C. and evaporated to dryness. After extraction with ethyl acetate and evaporation to dryness of the extract, the residue is recrystallized from ethyl alcohol. Yield 18 g. (83%) of 2-ethyl-3-hydroxy-4,5-dihydroxymethylpyridine hydrochloride. M.P. 190–192°.

*Example No. 5*

Thirty and three-tenth grams of 2-phenyl-3-amino-4-hydroxymethyl - 5 - aminomethylpyridine dihydrochloride are worked exactly as described in Example 4 for the 2-ethyl analog and with the same amounts of reactants. A yield of 20 g. (75%) of 2-phenyl-3-hydroxy-4,5-dihydroxymethylpyridine hydrochloride is obtained. M.P. 183–184°.

What we claim is:

1. A process for preparing an analytically pure compound of formula

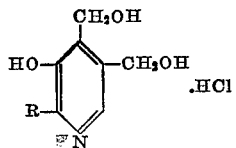

wherein R represents a member of the group consisting of phenyl and lower alkyl radicals having 1 to 8 carbon atoms, which comprises diazotizing one mole of a compound of the formula

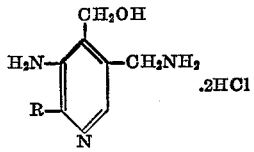

dissolved in aqueous 2 to 3% sulfuric acid containing about two moles of an alkali metal bromide, with 2 to 3 moles of an alkali metal nitrate at 80° C., adding to the obtained mixture sulfuric acid to a content of about 5%, heating the mixture at 80° C. for 7 to 8 hours, adjusting to pH between 7 and 8 with an alkali metal hydroxide, stirring the solution at 0° to 5° C., for 15–60 minutes with acetic anhydride, extracting with ethyl acetate the intermediate compound of the formula

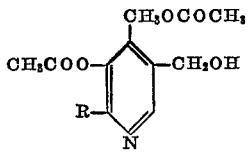

and hydrolyzing said compound with dilute hydrochloric acid.

2. A process for preparing analytically pure pyridoxine hydrochloride, which comprises diazotizing one mole of 2-methyl-3-amino-4-hydroxymethyl-5-aminomethylpridine dihydrochloride, dissolved in aqueous 2 to 3% sulfuric acid containing about two moles of sodium bromide, with 2 to 3 moles of sodium nitrite at 80° C., adding to the obtained mixture sulfuric acid to a content of about 5%, heating the mixture at 80° C. for 7 to 8 hours, adjusting to pH between 7 and 8 with sodium hydroxide, stirring the solution at 0° to 5° C. for about 30 minutes with acetic anhydride, extracting with ethyl acetate the intermediate 2-methyl-3-acetoxy-4-acetoxymethyl-5-hydroxymethylpyridine and hydrolyzing the same with dilute hydrochloric acid.

3. A process as described in claim 1, wherein the starting compound is 2-ethyl-3-amino-4-hydroxymethyl-5-aminomethylpyridine dihydrochloride.

4. A process as described in claim 1, wherein the starting compound is 2-isopropyl-3-amino-4-hydroxymethyl-5-aminomethylpyridine dihydrochloride.

5. A process as described in claim 1, wherein the starting compound is 2-isobutyl-3-amino-4-hydroxymethyl-5-aminomethylpyridine dihydrochloride.

6. A process as described in claim 1, wherein the starting compound is 2-n-amyl-3-amino-4-hydroxymethyl-5-aminomethylpyridine dihydrochloride.

7. A process as described in claim 1, wherein the starting compound is 2-phenyl-3-amino-4-hydroxymethyl-5-aminomethylpyridine dihydrochloride.

8. A compound of formula

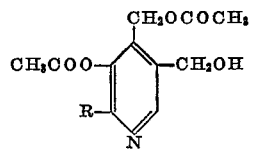

wherein R represents a member of the group consisting of phenyl and lower alkyl radicals having 1 to 8 carbon atoms.

9. A compound of formula

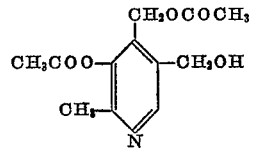

2-methyl-3-acetoxy-4-acetoxymethyl-5 - hydroxymethylpyridine.

10. In a process for the isolation of a compound of the formula

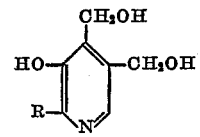

wherein R represents a member of the group consisting of phenyl and lower alkyl radicals having 1 to 8 carbon atoms, in substantially pure form from its admixture with alkali metal halides and sulfates, the step which comprises reacting the mixture with an acetylating agent at a temperature of about 0 to 5° C. to convert the said compound into its 3,4-diacetate, said diacetate being soluble in ethyl acetate in which the inorganic alkali metal salts are insoluble.

11. In a process for the isolation of pyridoxine in substantially pure form from its admixture with an alkali metal sulfate, the step which comprises reacting the mixture with acetic anhydride at a temperature of about 0 to 5° C. to form the 3,4-diacetate of the pyridoxine, said diacetate being soluble in ethyl acetate in which the alkali metal sulfate is insoluble.

References Cited in the file of this patent

UNITED STATES PATENTS

| | | |
|---|---|---|
| 2,422,622 | Harris | June 17, 1947 |
| 2,522,407 | Snell | Sept. 12, 1950 |

OTHER REFERENCES

Ichiba et al.: Sci. papers Institute Chem. and Phys. Research (Tokyo), vol. 35, pp. 73–77 (1938).